United States Patent [19]
Parker et al.

[11] Patent Number: 4,715,773
[45] Date of Patent: Dec. 29, 1987

[54] METHOD AND APPARATUS FOR REPOSITIONING A MISLOCATED OBJECT WITH A ROBOT HAND

[75] Inventors: Joey K. Parker, Tuscaloosa, Ala.; Frank W. Paul, Seneca, S.C.

[73] Assignee: Clemson University, Clemson, S.C.

[21] Appl. No.: 872,219

[22] Filed: Jun. 9, 1986

Related U.S. Application Data

[63] Continuation-in-part of Ser. No. 741,277, Jun. 4, 1985.

[51] Int. Cl.$^4$ ............................................. B25J 9/16
[52] U.S. Cl. .................................. 414/730; 414/786; 364/513; 318/568; 901/34; 901/9
[58] Field of Search .................... 901/30, 31, 33, 34, 901/35, 36, 32, 45, 9, 10; 294/119.1, 907; 414/730, 786, 741, 744 A, 753, 5, 6; 318/568, 568 D, 568 I, 646; 364/513

[56] References Cited

U.S. PATENT DOCUMENTS

| | | | |
|---|---|---|---|
| 3,226,833 | 1/1966 | Lemelson | 33/143 L |
| 3,888,362 | 6/1975 | Fletcher et al. | 414/620 |
| 3,948,093 | 4/1976 | Folchi et al. | 73/862.04 |
| 4,011,437 | 3/1977 | Hohn | 901/9 X |
| 4,204,959 | 5/1977 | Gruner | 210/195.1 |
| 4,423,998 | 7/1981 | Inaba et al. | 414/730 |

FOREIGN PATENT DOCUMENTS

| | | |
|---|---|---|
| 8202607 | 8/1982 | Japan. |
| 729545 | 4/1980 | U.S.S.R. |
| 841962 | 7/1981 | U.S.S.R. |

OTHER PUBLICATIONS

Okada, T., "Object-Handling System for Manual Industry", IEEE Transactions on Systems, Man and Cybernetics, vol. SMC-9, No. 2, pp. 79-89, Feb. 1979 issue.

Datseris et al, "Principles on the Development of Mechanical Hands which can Manipulate Objects by Means of Active Control", Transmissions and Automation in Design, vol. 107, No. 2, pp. 148-156, Jun. 1985 issue.

Brown, M. K., "Computer Simulation of a Controlled Impedance Robot Hand", International Conference on Robotics, Atlanta, Mar. 1984, pp. 442, 443, 446 and 447.

Pessen, David, "Tactile Gripper System for Robotic Manipulators", 12th International Symposium on Industrial Robots, Paris, 1982, pp. 411-414.

Witwicki, A. T., "A Method of Non-Positioned Workpieces Taking", 9th International Symposium on Industrial Robots, Tokyo, 1979, pp. 489-492, 494 and 501.

Edel, M. and D. Jolly, "Conception and Realization of an Intelligent and Autonomous End Effector", Robot VI Conference, Detroit, MI, Mar. 1982, pp. 552-554 and 557.

(List continued on next page.)

Primary Examiner—Robert J. Spar
Assistant Examiner—Jay I. Alexander
Attorney, Agent, or Firm—Dority & Manning

[57] ABSTRACT

An apparatus and method for translating an object held by at least two fingers of a robot hand to a predetermined position relative to a fixed point of the robot hand is disclosed. The apparatus comprises a linear potentiometer for sensing the position of each finger relative to the fixed point on the robot hand. A microcomputer identifies the finger at the greater distance from the predetermined position as the position-controlled finger, and identifies the other finger as the force-controlled finger. Pneumatic cylinders and valves impart movement to each finger. A pneumatic servo-valve controls movement of the position-controlled finger according to the position of the position-controlled finger relative to the fixed point of the robot hand. In an alternative embodiment, the movement of the position-controlled finger is controlled according to both the position of the position-controlled finger and the position of the force-controlled finger. A pair of strain gages senses the force between the force-controlled finger and the object. Another pneumatic servo-valve controls movement of the force-controlled finger according to the force sensed between the force-controlled finger and the object.

10 Claims, 22 Drawing Figures

OTHER PUBLICATIONS

Palm, W., D. Martino and P. Datersis, "Coordinated Control of a Robot Hand Possessing Multiple Degrees of Freedom", in Control of Manufacturing Process and Robotic Systems, ASME 1983, Winter Annual Meeting, pp. 1-2a, 12 and 15.

Salisbury, J. K., and J. J. Craig, "Articulated Hands: Force Control and Kinematic Issues", The International Journal of Robotics Research, vol. 1, No. 1, 1982, pp. 4, 12 and 14.

Wang, S. S. M. and P. M. Will, "Sensors for Computer Controlled Mechanic Assembly", The Industrial Robot, Mar. 1978, pp. 9-11 and 13.

Craig, J. J. and M. H. Raibert, "A Systematic Method of Hybrid Position/Force Control of a Manipulator", IEEE #CH1515-6/79/0000-0446, pp. 446-447.

Johnston, A. R., "Proximity Sensor Technology for Manipulator End-Effectors", Mechanism and Machine Theory, Pergamon Press (U.K.), vol. 12, 1977, pp. 95-108.

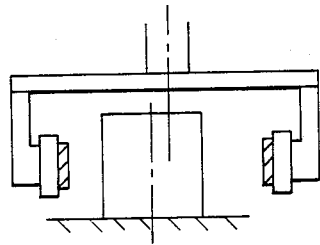
FIG. IA
PRIOR ART
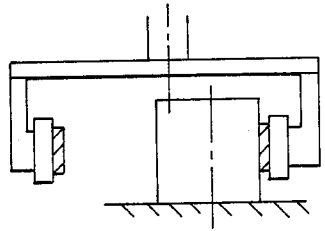
FIG. IB
PRIOR ART
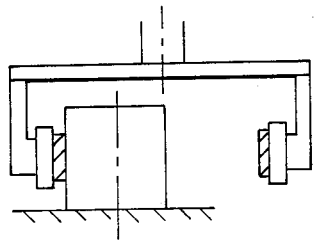
FIG. IC
PRIOR ART
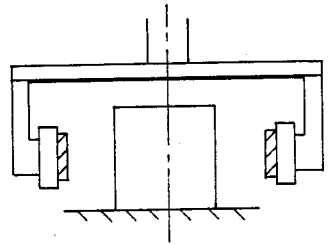
FIG. ID
PRIOR ART
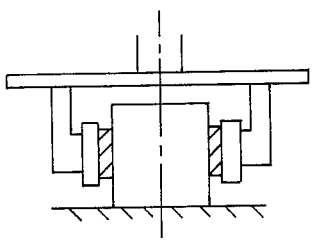
FIG. IE
PRIOR ART
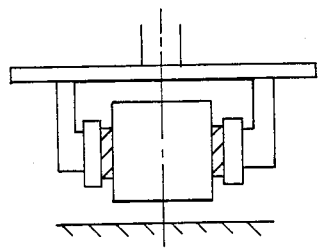
FIG. IF
PRIOR ART

METHOD AND APPARATUS FOR REPOSITIONING A MISLOCATED OBJECT WITH A ROBOT HAND

BACKGROUND OF THE INVENTION

This application is a continuation-in-part application of U.S. application Ser. No. 741,277, filed on June 4, 1985, which is hereby incorporated herein by this reference.

This invention relates to a method and apparatus for repositioning an object held by at least two fingers of a robot hand.

The manipulation of objects, which are those material things perceptible by one or more of the senses such as vision or touch, is an important requirement for automated manufacturing activities such as assembly, machine loading/unloading and tool changing. Many of these tasks can be done by industrial robots having a mechanism for acquisition, gripping and repositioning of objects.

The Robot Industries Association defines an "end-effector" as, "an actuator, gripper, or mechanical device attached to the wrist of a manipulator by which objects can be grasped or otherwise acted upon." In this specification, the term "robot hand" or "hand" will be used to describe the subset of "end-effectors" that are used for gripping objects and which have some resemblance to the human hand. The implements of the hand. which contact the object during gripping of the object, may be called fingers. The term "robot" or "robot system" indicates the combination of the robot hand and a robot arm. Stiffness is the inverse of compliance and represents the ability of the object to store energy due to deformations from applied forces which occur during acquisition of the object by a robot hand. Such energy is not dissipated, but may create motion of the object or is returned to the hand while gripping the object As used in this specification, the term "acquisition envelope" is an imaginary volume attached to the robot hand and inside of which the object to be gripped must fit for successful gripping. The shape and dimensions of this imaginary volume are functions of the hand kinematics, the geometry of the gripped object, and the environment in which acquisition occurs. The present invention assumes that the robot arm has sufficient capabilities to position the "acquisition envelope" of the robot hand to surround the object to be gripped within the acquisition envelope, but the exact location of the object is not necessarily known prior to completion of the gripping operation.

When a robot hand structure holds an object, the relative velocity of the contacting implements of the hand is zero. The interaction force between the held object and the contacting implements of the hand consists of a static force, which is the touch force between the hand implement and the object.

One procedure for repositioning at a predetermined location, an object held by at least two fingers has been demonstrated by IBM with their 7565 robot system. This technique, which is shown in FIG. 1, is a position control technique for a robot equipped with a two finger, one degree-of-freedom hand positioned initially about the object as shown in FIG. 1(A). The centerline of the object does not initially coincide with the centerline of the robot hand. The robot system locates the position of the object by moving both the robot arm and the hand to the left. The finger of the robot hand is equipped with a force sensor which can sense contact with the object as shown in FIG. 1(B). The robot arm then reverses direction upon receiving the contact signal and moves to the right until the other finger contacts the object as shown in FIG. 1(C). At each of the two contact locations, the positions of the robot arm are stored in memory by the robot controller, and this data is available to the microprocessor comprising the robot controller In FIG. 1(D), the hand has been repositioned to the center of the object, and the object is grasped in FIG. 1(E) by simultaneously and uniformly closing both fingers toward the center of the hand. The robot now can lift the object as shown in FIG. 1(F).

The above position-control procedure has several potential deficiencies when applied to manufacturing situations. The entire robot arm must be moved each time to make contact with the object. The inertia of a robot arm is generally much greater than the inertia of a finger of a robot hand, and larger inertias are more difficult to stop quickly. If fragile or stiff objects are to be grasped, any control strategy which begins after contact has been made may cause damage to the object prior to grasping. Moreover, without a force-control ability, the closing of the two fingers to grasp the object may damage fragile objects. Moreover, the time required to perform the search operation can become a significant part of the total cycle time associated with the task. Additionally, current robot arm systems have limited ability to perform the substantial amount of tactile sensor interfacing and complex positioning of the robot arm that is required to implement the above procedure.

An acquisition procedure based upon force-controlling two one-degree-of-freedom fingers does not permit the gripped object to be positioned at a desired location.

A robot arm required to perform a task such as washing windows relies upon a combination of position-control over a two-degree-of-freedom plane and force-control in a direction perpendicular to the two-degree-of freedom position-control plane. However, this procedure does not involve shifting the position of a gripped object to a different position in the robot hand

OBJECTS AND SUMMARY OF THE INVENTION

It is a principal object of the present invention to provide an apparatus and method that allows objects grasped at highly variable locations to be relocated and placed at repeatable, known locations in a controlled manner.

Another object of the present invention is to provide an apparatus and method of centering an object held by at least two fingers of a robot hand, that simultaneously achieves accurate centering, control over the gripping force exerted on the object, and minimizes the time required to complete the centering motion.

An additional object of the present invention is to provide an apparatus and method for moving to a predetermined position an object held by at least two fingers of a robot hand such that smaller maximum gripping forces occur during the motion to the predetermined position, the motion occurs in a shorter time, and the final gripping force of the object closely approximates the desired value for this force.

A further object of the invention is to provide a method and apparatus for moving to a predetermined point, an object held by at least two fingers of a robot hand such that the method and apparatus minimizes any dependence upon the stiffness of the robot hand implements which contact the object.

Still another object of the invention is to provide a method and apparatus for moving to a predetermined position an object held by at least two fingers of a robot hand such that the effect upon the apparatus and method of the external damping of the movement of the fingers is minimized.

Yet another object of the present invention is to provide a method and apparatus for moving to a predetermined position an object held by at least two fingers of a robot hand such that the method and apparatus is not significantly affected by objects of different mass.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, an apparatus for translating an object held by at least two fingers of a robot hand, to a predetermined position relative to a fixed point of the robot hand, comprises: means for sensing the position of each finger relative to the fixed point of the robot hand; finger differentiation means for identifying the finger at the greater distance from the predetermined position as the position-controlled finger and for identifying the other finger as the force-controlled finger; means for moving each finger; means for controlling movement of the position-controlled finger according to the position of the position-controlled finger relative to the fixed point of the robot hand; means for sensing the force between the force-controlled finger and the object; and means for controlling movement of the force-controlled finger according to the force sensed between the force-controlled finger and the object.

The objects and the purpose of the present invention also are accomplished by a method for translating an object held by at least two fingers of a robot hand at a predetermined gripping force, to a predetermined position relative to a fixed point of the robot hand. This method comprises: sensing the position of each finger relative to the fixed point of the robot hand; for each finger, determining whether the finger is at the greater distance from the predetermined position; selecting the finger at the greater distance as the finger to be position-controlled and selecting the other finger as the finger to be force-controlled; moving each position-controlled finger toward the predetermined position; controlling movement of the position-controlled finger according to the position of the position-controlled finger relative to the fixed point of the robot hand; sensing the grasping force between the force-controlled finger and the object; controlling movement of the force-controlled finger according to the grasping force sensed between the force-controlled finger and the object; stopping movement of each position-controlled finger when the object reaches the predetermined position relative to the fixed point of the robot hand; and when each position-controlled finger is stopped and the predetermined grasping force is applied to the object, then stopping each force-controlled finger.

The above embodiments of the apparatus and method of the present invention are for a robot hand which grips the exterior of an object. However, some robot hands grip an object from the interior. For example, some robot hands grip a hollow cylinder by placing the fingers inside the cylinder and spreading the fingers outwardly to contact the cylinder from the interior. Such interior gripping robot hands require a slightly different embodiment of the present invention than the ones described above. The difference is that the finger differentiation means identifies the finger at the lesser distance from the predetermined position, as the position-controlled finger. Accordingly, in the method applicable to an internal gripping robot hand, it is necessary to determine whether the finger is at the lesser distance from the predetermined position.

The accompanying drawings, which are incorporated in and constitute a part of this specification, illustrate the embodiments of the invention and, together with the description, serve to explain the principles of the invention.

BRIEF DESCRIPTION OF THE DRAWINGS OF THE PREFERRED EMBODIMENTS

FIG. 1 illustrates a conventional procedure for acquiring and repositioning an object by a robot system;

DESCRIPTION OF THE PREFERRED EMBODIMENTS

Reference will now be made in detail to the present preferred embodiments of the invention, examples of which are illustrated in the accompanying drawings.

In accordance with the invention, an apparatus for translating an object held by at least two fingers of a robot hand, to a predetermined position relative to a fixed point of the robot hand, comprises: means for sensing the position of each finger relative to the fixed point of the robot hand; finger differentiation means for identifying the finger at the greater distance from the predetermined position as the position-controlled finger and for identifying the other finger as the force-controlled finger; means for moving each finger; means for controlling movement of the position-controlled finger according to the position of the position-controlled finger relative to the fixed point of the robot hand; means for sensing the force between the force-controlled finger and the object; and means for controlling movement of the force-controlled finger according to the force sensed between the force-controlled finger and the object.

Figure 2:
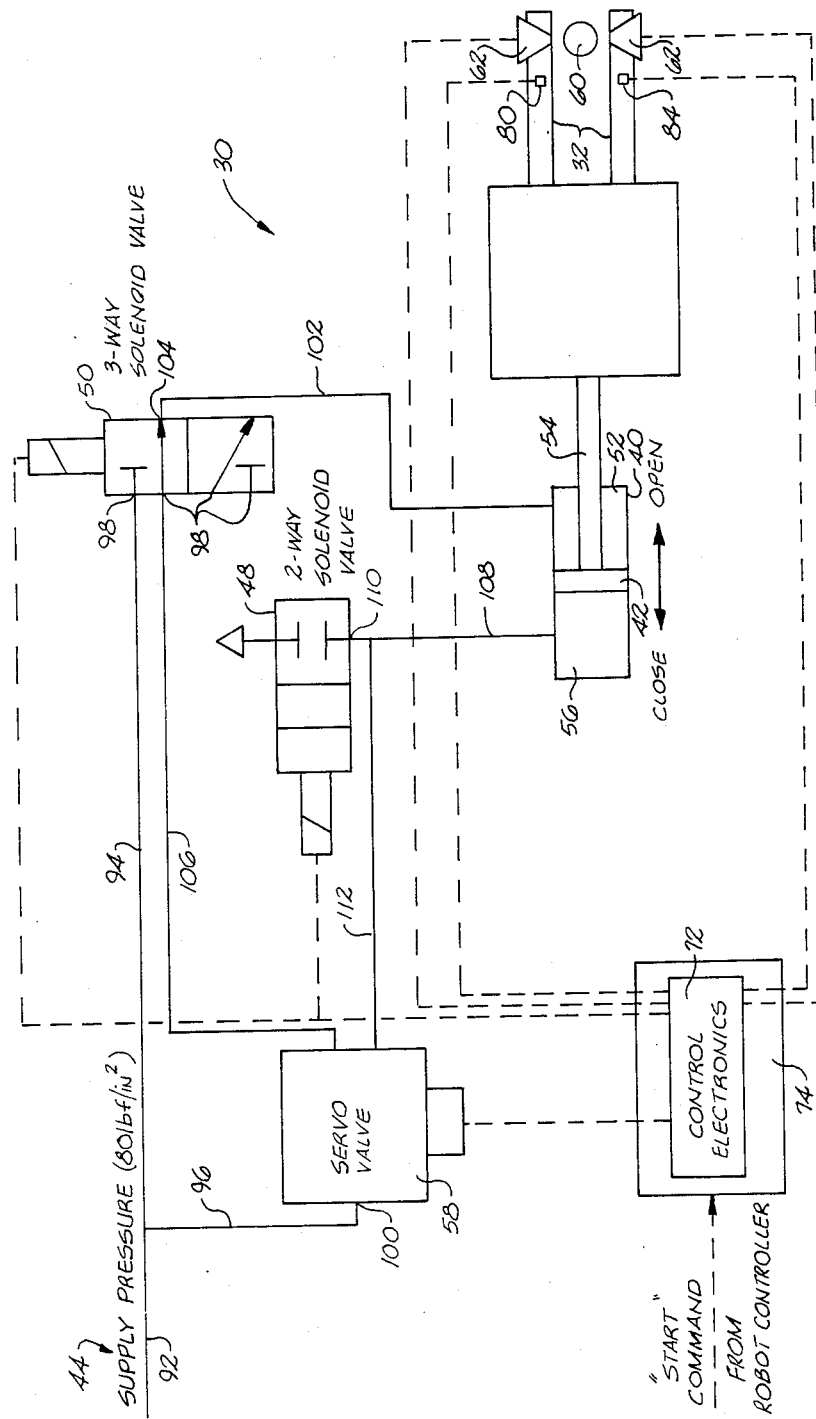
FIG. 2 is a schematic diagram of an embodiment of the present invention.

The preferred embodiment of an apparatus for translating an object held by at least two fingers of a robot hand to a predetermined position relative to a fixed point of the robot hand, is shown schematically in FIG. 2 and is represented generally by the numeral 30. FIG. 2 shows a schematic of the control system for one finger of the hand, while an identical system is used to control a second independent finger. The robotic positioning operation normally requires at least two opposed fingers surrounding and holding the object to be positioned. The moving components of the apparatus of the present invention for translating an object operate essentially identically for each of the two fingers comprising a robot hand.

Figure 3:
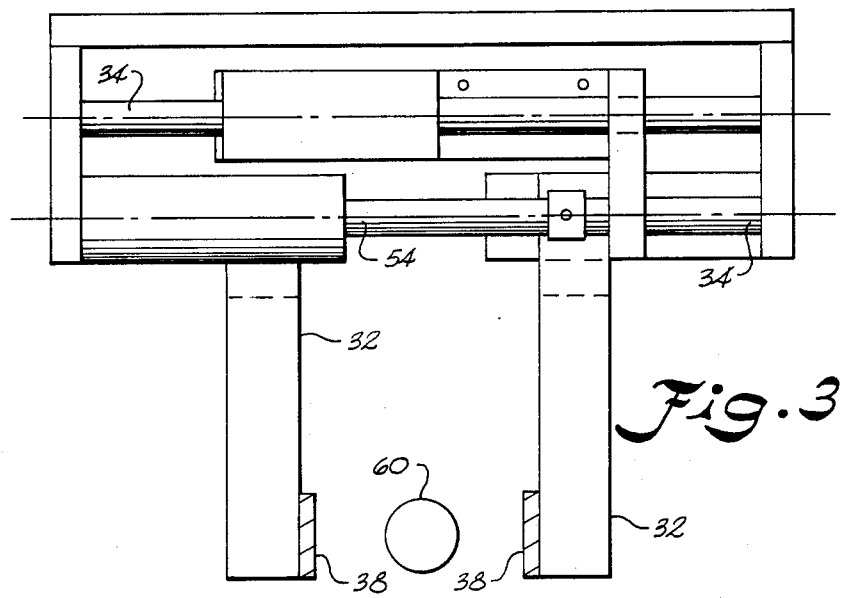
FIG. 3 is a top plan view of an embodiment of a two-degree of freedom robot hand according to an embodiment of the present invention.
Figure 4:
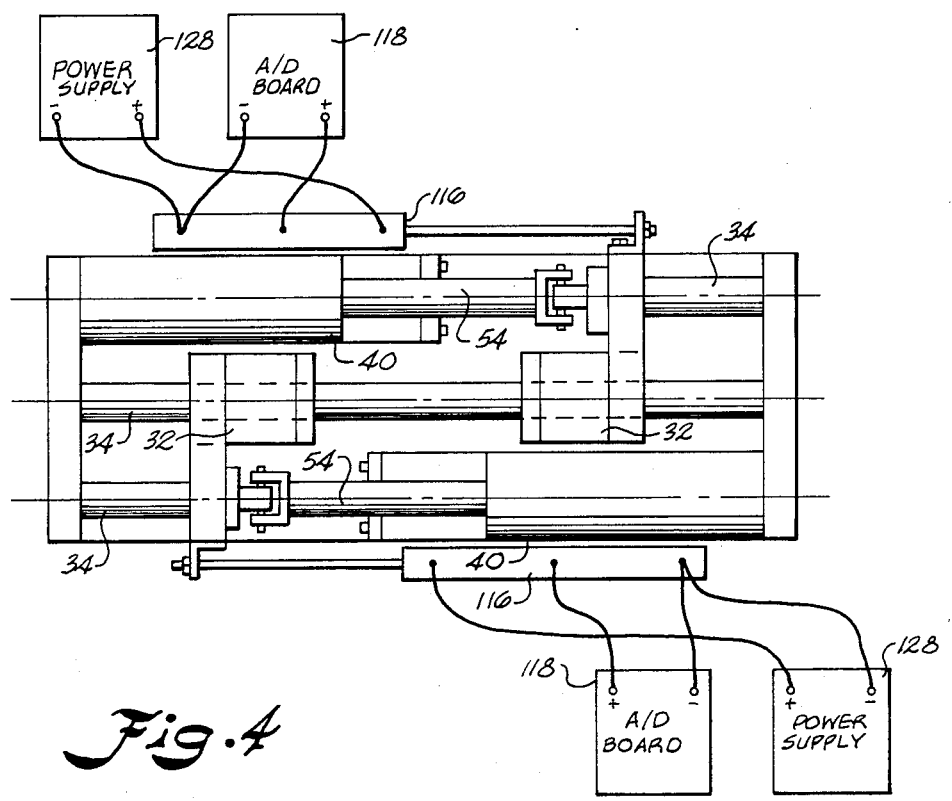
FIG. 4 is a front plan view of a hand similar to the embodiment of FIG. 3.

The preferred embodiment of the apparatus of the invention includes a robot hand having means for contacting an object located within the acquisition envelope of the hand. As embodied herein and shown for example in FIGS. 3 and 4, the robot hand includes a pair of stiff robot fingers 32 movable in at least two directions along a pair of parallel steel shafts 34. As shown in FIGS. 3 and 4, each finger is supported by linear ball bushings which ride on two parallel steel shafts 34. There are three parallel steel shafts 34 in all, and one of these shafts is a middle shaft, which is shared by both fingers. Each of the two remaining shafts supports only one of the two fingers. Referring to FIG. 4, the uppermost shaft is toward the back and away from the middle shaft, and the lower shaft is directly underneath the uppermost shaft, and toward the back relative to the middle shaft. The fingers can open to a maximum separation distance of approximately 8 inches (20 cm), which provides a large acquisition envelope.

Figure 5:
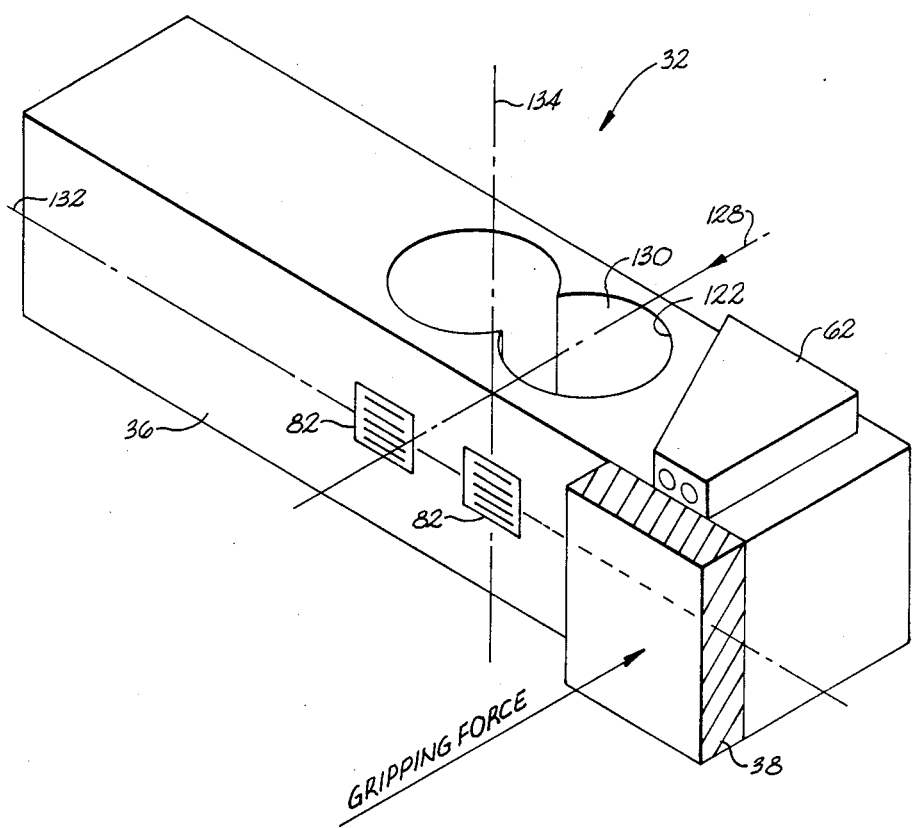
FIG. 5 is a perspective view of one embodiment of a force sensor mounted on an embodiment of a finger of a hand according to the invention.

A more detailed embodiment of finger 32 is shown in FIG. 5. For external gripping fingers, the surface of each finger facing towards the acquisition envelope is designated a closing surface 36 because it closes on the object during the grasping operation and contacts the object during the holding operation, the latter also known as the gripping operation. At the free end of each finger is a fingertip 38, which may be formed of polyurethane and is mounted on the closing surface of each finger. For fingers which contact the object from the interior of the object, so-called internal gripping fingers, fingertip 38 is mounted on the surface of the finger that contacts the interior of the object. The finger still closes on the object, but the motion of the fingers is a motion that increasingly separates the fingers from each other, rather than bringing the fingers closer to each other as is the case with the aforementioned external gripping fingers.

In accordance with the invention, the apparatus of the present invention includes means for sensing the position of each finger relative to the fixed point of the robot hand. As embodied herein and shown for example in FIG. 4, the position sensing means preferably includes a linear potentiometer 116. One potentiometer is mounted above the top parallel steel shaft 34, and another potentiometer 116 is mounted below the bottom parallel shaft 34. Each potentiometer 116 is connected electrically to a power supply 128 and supplies electrical input signals to an analog-to-digital converter 118.

Figure 8:
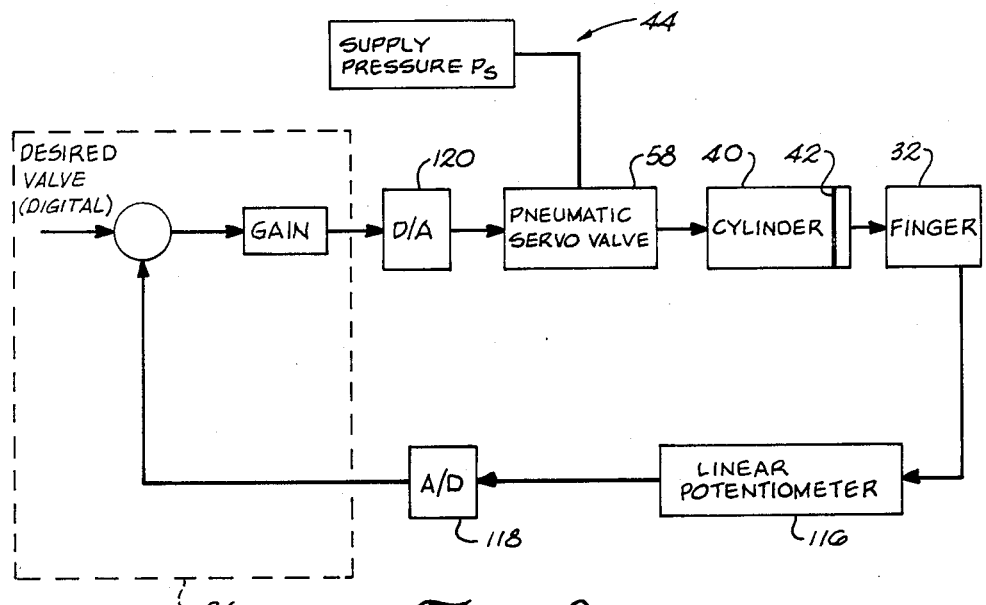
FIG. 8 is a schematic diagram of an embodiment of a control loop for a position-controlled finger according to the present invention.

As shown for example in FIG. 8, the analog-to-digital converter converts the analog input signal from the linear potentiometer into a 12 bit digital signal, which can be supplied in turn to a microcomputer input port.

There are several alternative embodiments for the means for sensing the position of each finger relative to the fixed point of the robot hand. Among them are a linear variable differential transformer (LVDT), a linear optical encoder, a rotary potentiometer used in conjunction with a rack and pinion gear, a rotary optical encoder used in conjunction with a rack and pinion gear, a rotary variable differential transformer (RVDT) used in conjunction with a rack and pinion gear, and a syncro converter used in conjunction with a rack and pinion gear. Typically, in those alternative embodiments employing a rack and pinion gear, the rack is mounted to move in conjunction with piston 42 of cylinder 40 of the finger in question, and the pinion gear is mounted to respond to movement of the rotary portion of the respective potentiometer, encoder, transformer or converter.

In further accordance with the present invention, the apparatus for translating an object to a predetermined position includes finger differentiation means. Depending upon whether the embodiment is an external gripping or internal gripping embodiment, the finger differentiation means permits identification of the finger at the greater or lesser distance, respectively, from the predetermined position, as the position-controlled finger. The finger differentiation means also identifies the other finger as the force-controlled finger. As embodied herein and shown for example in FIGS. 2, 7, 8 and 9, the finger differentiation means comprises a microcomputer 86 which has been preprogrammed to calculate the position of each finger from the signal supplied by the respective linear potentiometer associated with each finger.

As embodied herein and described more particularly hereinafter, the software for calculating the position of each finger and selecting the position-controlled finger and the force-controlled finger, comprises the CENTER procedure, and lines 190-440 of the program listed hereinafter. Lines 190-440 are formulated for an external gripping embodiment. However, for an internal gripping embodiment, these lines can be recoded to find the finger with the lesser distance from the predetermined position.

The microcomputer is also preprogrammed with the position to which the object is to be translated. The positions of the fingers are compared to the predetermined position to which the object is to be translated. Depending on whether the embodiment is external or internal gripping, this comparison yields the finger at the greater or lesser distance, respectively, from the predetermined position.

In accordance with the invention, the apparatus of the invention includes means for moving each finger. As embodied herein and shown for example in FIGS. 8 and 9, the means for moving each finger 32 preferably includes a digital-to-analog converter 120, and a pneumatic cylinder 40 having a piston 42 therein connected to a pneumatic pressure supply circuit generally designated 44 and having a pneumatic jet pipe servovalve 58.

The pneumatic cylinders comprising the means for moving the fingers are Compact Air #S-1 ⅛×4 models. Referring to FIG. 2 for example, each cylinder is divided into a first chamber 52 on the side of the piston attached to a piston rod 54 and a second chamber 56 on the other side of the piston. Each cylinder has a 4 inch (10 cm) stroke. As shown in FIG. 4 for example, the end of piston rod 54 opposite to the end attached to piston 42, is attached to a finger.

Figure 6:
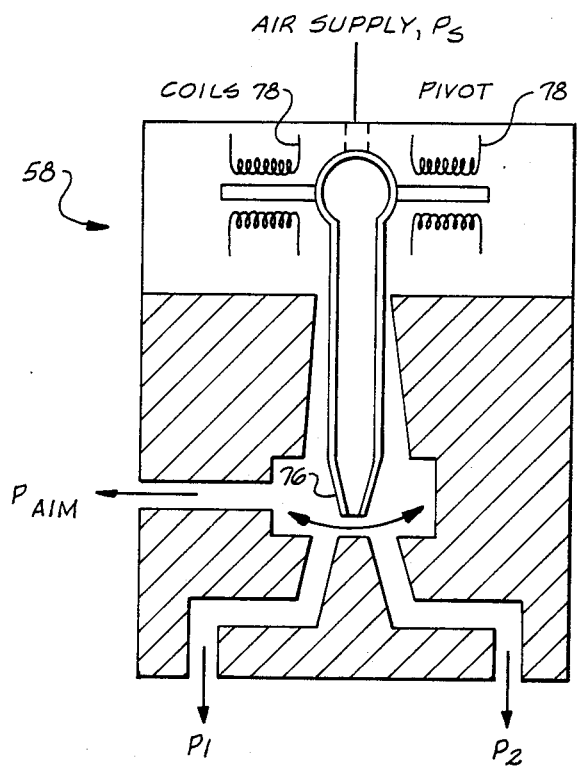
FIG. 6 is a cross-sectional view of a proportional pneumatic jet-pipe servovalve used in an embodiment of the invention.
Figure 7:
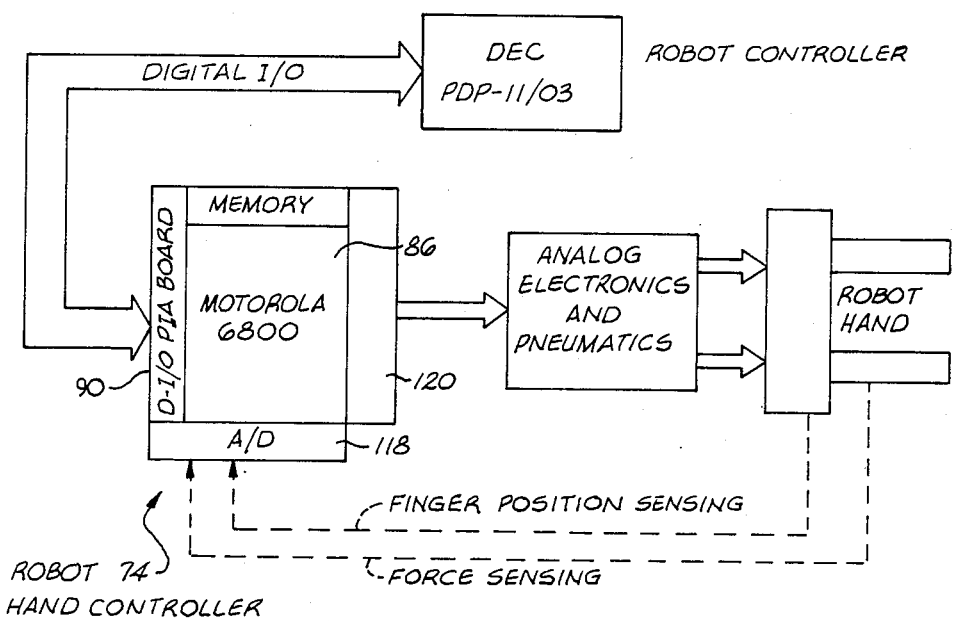
FIG. 7 is a schematic diagram of a microcomputer control system according to an embodiment of the invention.

A pneumatic jet-pipe servovalve 58, such as an Atchley Controls Model #100, was used in the preferred embodiment of the robot hand object positioning apparatus and method of the present invention. FIG. 6 shows a schematic diagram of this pneumatic servovalve, which acts as an active modulated transducer with a constant input air supply pressure $P_s$, a modulating electrical current, and two pneumatic outputs, $P_1$ and $P_2$. Although servovalves are generally considered flow sources, the pneumatic servovalve acts much more like a pressure source, since the two pressure outputs depend upon the supply pressure $P_s$ and the position of a jet pipe 76, which is controlled by electromagnetic coils 78. The coil resistance is approximately constant, resulting in a coil current proportional to the applied voltage.

There are alternative embodiments for the means for moving each finger. For example, electric stepping motors or direct current electric motors can be used in conjunction with rack and pinion gears, and each of these combinations can be substituted for the servovalve and the pneumatic cylinders of the preferred embodiment.

In still further accordance with the invention, the apparatus of the present invention includes means for controlling movement of the position-controlled finger according to the position of the position-controlled finger relative to the fixed point of the robot hand. For example, as embodied herein and shown in FIG. 8, the means for controlling movement of the position-controlled finger according to the position of the position-controlled finger relative to the fixed point of the robot hand includes proportional pneumatic servovalve 58, digital-to-analog converter 120 and a robot hand control means 74.

Robot hand control means 74 has memory means. For example, as embodied herein and shown in FIG. 7, the robot hand control means having memory means comprises a programmable electronic microcomputer 86 having two accessory interface boards, namely, one containing digital-to-analog converter 120 and analog-to-digital converter 118, and a second containing digital input/output interface 90.

Programmable electronic microcomputer 86 receives inputs from the linear potentiometer of the position-controlled finger and calculates the distance between its present position and the position where the position-controlled finger must position itself in order to effect translation of the object to the predetermined position relative to the fixed point of the robot hand. The magnitude of this distance is represented by a digital signal which is outputted by the microcomputer by digital-to-analog converter 120, which yields a resulting analog signal. Proportional pneumatic servo valve 58 associated with the position-controlled finger receives this analog signal and accordingly adjusts the pressure across piston 42 depending upon the magnitude of the analog signal. Thus, for greater distances, servovalve 58 is provided with a larger analog signal that causes a greater pressure to be provided across piston 42. As the distance decreases, the magnitude of the analog signal decreases, and the pressure across piston 42 also decreases. Accordingly, control is provided by the actuation of the servovalve for the position-controlled finger to adjust the equilibrium between the chambers of pneumatic cylinder 40 and thus adjust movement of finger 32 toward the desired position for the position-controlled finger.

This controlling means has the capability to select the position of the force-controlled finger as the desired position of the position-controlled finger. Position is understood to mean the measured position, i.e.—the absolute value of the distance from a reference point (in this case the centerline of the robot hand) to the location of the finger. This capability is useful in applications in which the size of the object being grasped is unknown, but the object is known to be symmetrical with respect to a centerline 130 (FIG. 11) of the object that is perpendicular to the direction of the grasping motion of the fingers of the robot hand. For example, in the embodiment of the invention depicted in FIG. 8, the desired value for the position-controlled finger is based on the position of the force-controlled finger. Thus, the movement of the position-controlled finger is controlled according to the position of the force-controlled finger as well as the position of the position-controlled finger. This is a special case of the more generalized situation in which the desired value is the predetermined position at which the object is to be placed.

A Motorola EXORCISER II microcomputer development system was chosen as the robot hand control means of the preferred embodiment of the present invention. This microcomputer uses a Motorola M6800 microprocessor with a system clock speed of 1 Mhz. A microcomputer was used for controlling the hand, since different control strategies could be implemented by changing software programs. For example, microcomputer 86 has the capability to receive and analyze additional data, such as output signals from proximity sensing means. The 6800 microprocessor chip uses an 8 bit data and control bus. This particular microcomputer system was selected over other 8 bit systems only because of availability and the capability of programming in the MPL language.

Figure 9:
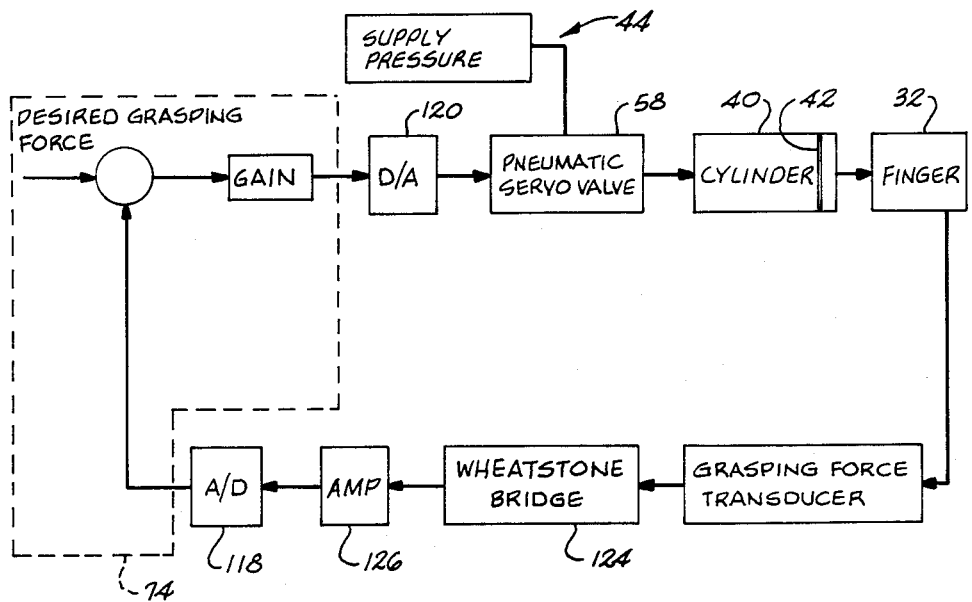
FIG. 9 is a schematic diagram of an embodiment of a control loop for a force-controlled finger according to the present invention.

Two accessory interface boards were added to the base computer system for use with the robot hand of the preferred embodiment of the present invention. As shown in block diagram format in FIG. 7, an Analog Devices #AD-1231 board provides an analog-to-digital converter 118 with capability for 16 channels of analog to digital (A/D) input and a digital-to-analog converter 120 with capability for 2 channels of digital to analog (D/A) output. The A/D channels are used for reading the force sensor outputs (described hereinafter) and for reading the linear potentiometers which are used to measure the linear position of each finger. The D/A channels are used to drive the operational amplifiers connected to the pneumatic servovalve of each finger, as shown in FIGS. 8 and 9. A second interface board 90 uses a Motorola M6821 Interface Adapter (PIA) chip and was fabricated by Engineering Services at Clemson University. This PIA board provided 8 channels of digital input/output (I/O), which was used for communicating with the robot arm control computer, a Digital Equipment Corporation PDP-11/03.

An alternative embodiment of the robot hand control means comprises a logic circuit (not shown) which is a circuit dedicated to the particular series of adjustments required by the control loop of the force-controlled finger or the position-controlled finger. Because the logic circuit is not programmable, a separate circuit needs to be provided for each of the desired control adjustments. The use of a logic circuit in place of a programmable microcomputer could be cost effective for specific applications. For example, in some applications, the flexibililty to change the desired gripping force or the predetermined position to which the object is to be repositioned, is not required.

In yet further accordance with the apparatus of the present invention, there is provided means for sensing the touch force between the force-controlled finger and the object. As mentioned above, the touch force is the static force between the contacting means of the robot hand and the object, and this is the force between the contacting means and the object when the velocity of the contacting means relative to the object is zero. The touch force is the same as the gripping force, which is the force applied to the object by each finger while the object is held by the fingers. As embodied herein and shown for example in FIG. 5, the means for sensing the touch force (or gripping force) between the force-controlled finger and the object preferably comprises at least two strain gages 82. Briefly, as shown schematically in FIG. 9, the strain gages used in the preferred embodiment of the present invention convert a change in length into a change in resistance, and this change in resistance is converted into a voltage by an electronic Wheatstone bridge circuit 124. The voltage is fed to an amplifier 126 and supplied to an analog-to-digital converter 118 to yield a 12-bit digital signal which can be supplied to and processed by an electronic microcomputer unit 86.

Preferably a total of two strain gages 82 are used for each finger of the robot hand comprising the illustrated embodiment of the apparatus of the present invention. These two strain gages are used to measure strain (change in length per unit length) at the two sites indicated in FIG. 5. The pair of gages measures the touch force between the finger and the object. Each gage 82 measures a strain, and the difference between these two strain measurements is proportional to the touch force. A hollow cavity 122 is preferably provided behind the pair of gages 82 to amplify at the sites of the strain gages, the effect of the strain caused by forces applied to finger 32.

The design shown in FIG. 5 effectively addresses the considerations of stiffness and sensitivity. Sensitivity is high since the reduced moment of inertia greatly increases the strain under the gages. The stiffness remains large since this reduced area is confined to a small portion of the entire sensor. The only potential significant drawbacks to this design are that strain gages are not always reliable when used in industrial environments, and the low electrical signal levels produced by strain gages are susceptible to noise. However, both of these potential problems could be overcome with appropriate additional design features not implemented in the illustrated embodiment.

The placement of the strain gages comprising the force sensor is important in achieving measurements which are independent of the point of contact between the fingertip and the object. Robot hands are usually capable of grasping objects anywhere along the fingertips. Ideally, the measured touch force should not be influenced by the relative position of the force sensor on the finger and the point of contact of the fingertip with the object. One of the most important features of the force sensor shown in FIG. 5 is that the force sensor output is independent of the point of force application on the fingertip. This positioning independence is accomplished by having a force sensor comprising two strain gages. Each strain gage measures an absolute strain that is dependent upon the relative position of the strain gage and the point of contact of the fingertip with the object. However, the difference between the two strain measurements of the two strain gages comprising the force sensor yields a strain parameter that is proportional to the touch force and independent of variations in position between the strain gages and the point of contact of the fingertip with the object.

The final consideration for the force sensor is the independence of touch force signals from the weight of the object. As shown in FIG. 5, the touch force strain gages are centered across the finger so that they will not be affected significantly by the weight of the object being gripped. This is accomplished by carefully placing the two strain gages on one of the sides of the finger that forms a plane perpendicular to the direction of travel of the finger. The preferred orientation of each stain gage is shown in FIG. 5. First, strain gages 82 are mounted on one of the sides of finger 32 that forms a plane which is perpendicular to the direction of travel of the finger. The direction of travel of finger 32 is indicated by an arrow 128 which forms part of a centerline 130 of hollow cavity 122. Centerline 130 forms a diameter of hollow cavity 122. A longitudinal centerline 132 longitudinally bisects closing surface 36 of finger 32. Longitudinal centerline 132 passes through the center point of eaoh strain gage 82. A vertical centerline 134 passes through the center point of strain gage 82 and intersects with centerline 130 of hollow cavity 122 positioned behind the respective strain gage in question. The peripheral sides of each strain gage 82 preferably are parallel to the respective longitudinal centerline 132 and vertical centerline 134. In addition, strain gages 82 can be positioned on the side of finger 32 opposite closing surface 36, or one strain gage can be positioned on closing surface 36 with the other strain gage positioned on the side opposite closing surface 36. The side opposite closing surface 36 is not shown in the view of FIG. 5.

There are several alternative embodiments for the means for sensing the touch force between the force-controlled finger and the object. Instead of foil strain gages as shown in FIG. 5, it is possible to employ semiconductor strain gages. A commercially available load cell can be mounted to the end of the finger beneath fingertip 38. In yet another alternative embodiment, a piezoresistive force transducer can be mounted at each fingertip in place of fingertip 38. Tactile sensors comprise yet another alternative embodiment and can be mounted at several locations close together in place of fingertip 38. The paired strain gage embodiments, including the preferred embodiment, are force sensing devices for measuring the bending moment of the finger, and this moment is proportional to the force applied to the finger. The other embodiments of the force sensing means actually measure the force applied at their locations on the finger and thus must be positioned at the actual gripping site of the finger. This corresponds to the place where fingertip 38 is located on the finger. For external gripping embodiments of the robot hand, fingertip 38 is positioned as shown in FIGS. 3 and 4. However, for internal gripping robot hand embodiments, the fingertips would be placed on the opposite surfaces of the fingers shown in FIGS. 3 and 4. One of the reasons for preferring the foil strain gages is their relative cost effectiveness, especially in relation to a commercial load cell or commercially available tactile sensors. Moreover, the strain gages are less dependent upon being placed at the exact location where the finger makes contact with the object.

In still further accordance with the present invention, the apparatus for translating an object to a predetermined position comprises means for controlling movement of the force-controlled finger according to the force sensed between the force-controlled finger and the object. As embodied herein and shown for example in FIG. 9, the means for controlling movement of the force-controlled finger according to the force sensed between the force-controlled finger and the object comprises a robot hand control means 74 having a memory means storing a predetermined touch force signal for comparison with the touch force signals provided by force sensors. The robot hand control means preferably comprises a digital microcomputer 86.

As shown in FIG. 5, at least two strain gages 82 are mounted near the free end of the contacting means. A strain gage preferably is mounted at each of two sites on a closing surface 36, i.e., a surface facing the object to be grasped, of each finger. The pair of strain gages measures the touch force between the force-controlled finger and the object. Each strain gage sends a signal to the robot hand control means, and the difference between the individual measurements of the two strain gages is proportional to the touch force between the force-controlled finger and the object.

As the position-controlled finger moves the object toward the predetermined position, microcomputer 86 monitors the touch force sensors of the force-controlled finger. When microcomputer 86 receives a force output signal from the touch force sensor of the force-controlled finger, microcomputer 86 compares this signal to the force signal stored in the microcomputer memory as the desired touch force magnitude. Depending upon whether the force sensor signal is greater or less than the signal stored in memory, microprocessor 86 controls servovalve 58 to apply pressures to the two chambers of cylinder 40 such that the net force on piston 42 moves finger 32 against the object with the predetermined touch force stored in the memory means of microcomputer 86.

Microcomputer 86 is programmed to respond to a preprogrammed force signal level from a force sensor. Thus, a finger can be brought to a halt when it applies a touch force equal to a predetermined force level with which the microcomputer has been preprogrammed.

COMPUTER PROGRAM DESCRIPTION AND LISTINGS

The computer programs used to control the robot hand of the preferred embodiment of the present invention are divided into two groups: (1) programs for the Motorola 6800 microcomputer which directly controls the robot hand, and (2) supervisory programs for controlling the robot arm. A description of each hand control program's purpose will be followed by the program listings.

ROBOT HAND CONTROL SOFTWARE

All control programs used on the Motorola EXORCISER microcomputer are written in Motorola Programming Language (MPL) which has a syntax similar to the mainframe language PL/I. This language is higher level than assembly or machine language, but not as high level as FORTRAN or PASCAL. This language was selected because the editor and error message facilities allow low level code useful for control algorithms to be written much faster than by using assembly language.

The MPL control program is divided into three parts: (1) main program, (2) major procedures (subroutines), and (3) minor procedures. This structure for the program allows individual procedures to be changed and the program segments linked without requiring the entire program to be re-compiled each time.

The main MPL program is named HAND and a listing is given below. The main program performs the following activities: (1) initializes all variables used in the main program and all variable values passed to the procedures (lines 200–810), (2) reads in variable values from the terminal at program initialization (lines 820–1330), (3) communicates with the robot control computer through the variables DATA and DATB (lines 1340–1550, 1620, 1640, 1660, 1700-1720), and (4) selects appropriate major procedure (LOCATE, GRASP, or CENTER) based on information received from the robot computer (lines 1550–1790).

The major procedure LOCATE is used to find the center of the object in the radial direction of the robot arm. This procedure is called from the main program HAND. Procedure GRASP is used to grasp the object with the hand and is called from the main program after the object has been found by LOCATE.

The CENTER procedure is called after the object has been grasped by the hand and moved from the grasp site by the robot. The steps in this procedure are: (1) determine which finger has the largest (or smallest if the embodiment is an internal gripping hand) displacement and make that finger position controlled while force controlling the other finger (lines 190–440), (2) command the position-controlled finger to move toward (or away if the embodiment is an internal gripping hand) the position of the force-controlled finger (lines 550–660) while maintaining force control with the force-controlled finger (lines 470–520), and (3) continue with step #2 until the robot control computer initiates a release command (line 680). The position control strategy outlined in this procedure will always center an object of any unknown diameter while maintaining a constant gripping force. The fingers of the embodiment of the hand built by the inventors to demonstrate the present invention can move faster when opening than closing, and this fact influenced the use of the strategy outlined in step #1.

Four minor procedures are used by the main program as well as the three major procedures. Listings for the minor procedures and the task performed by each are discussed below: (1) ADREAD—reads a specified A/D (analog-to-digital) channel and returns the result as a signed 16 bit value, (2) DASET—sets the output of one of the two D/A (digital-to-analog) converters, (3) QUIT—determines if any key has been pressed on the keyboard, and returns control to the operating system if a key has been pressed, and (4) RDVAL—reads a signed 16 bit value from the keyboard.

In accordance with the invention, the method for translating an object held by at least two fingers of an external gripping robot hand at a predetermined gripping force to a predetermined position relative to a fixed point of the robot hand comprises: sensing the position of each finger relative to the fixed point of the robot hand; for each finger, determining whether the finger is at the greater distance from the predetermined position;

selecting the finger at the greater distance (if the robot hand is an internal gripping embodiment, the finger at the lesser distance is selected) from the predetermined position as the finger to be position-controlled and selecting the other finger as the finger to be force-controlled; moving each position-controlled finger toward the predetermined position; controlling movement of the position-controlled finger according to the position of the position-controlled finger relative to the fixed point of the robot hand; sensing the gripping force between the force-controlled finger and the object; controlling movement of the force-controlled finger according to the gripping force sensed between the force-controlled finger and the object; stopping movement of the position-controlled finger when the object reaches the predetermined position relative to the fixed point of the robot hand; and when the position-controlled finger is stopped and the predetermined gripping force is applied to the object, then stopping the force-controlled finger.

In accordance with the method of the present invention, there is provided the step of sensing the position of each finger relative to the fixed position of the robot hand. As embodied herein, the step of sensing the position of each finger relative to the fixed point of the robot hand includes the use of a linear potentiometer attached to each finger of the robot hand. Movement of the finger causes the linear potentiometer to produce a different voltage depending upon the position of the finger. This voltage signal is applied to an analog-to-digital converter to yield a 12-bit digital signal which can be provided to an electronic microprocessor for processing therein.

In one embodiment of the invention comprising two fingers under the control of a single robot hand control means, it is important for the hand control means to recognize which of the two fingers is at the greater distance from the predetermined position.

In accordance with the present invention, there is provided the step of determining, for each finger, whether the finger is initially at the greater distance from the predetermined position. As embodied herein, this step is accomplished by an electronic microcomputer having memory means for storing a digital signal corresponding to the voltage reading of a linear potentiometer positioned at a point such that the object to be repositioned will be positioned at the desired position relative to a fixed point on the robot hand. The microcomputer is programmed to calculate the distance required by each finger to travel to effect translation of the object to the predetermined position. The microcomputer then is programmed to compare the results of this calculation and to identify which of the two fingers is required initially to move the greater distance to effect translation of the object to the predetermined position.

In accordance with the method of the present invention, there is provided the step of selecting the finger at the greater distance from the predetermined position as the finger to be position-controlled and selecting the other finger as the finger to be force-controlled. This selection is preferably accomplished by a microcomputer programmed to place one of the fingers under the control of the position-control procedure and the other of the fingers under the control of the force-control procedure. The microcomputer is programmed to place the finger required to move the greater distance under the position-control procedure programmed into the microcomputer. The other finger then is placed by the microcomputer under the control of the force-control procedure programmed into the microcomputer. This step is applicable to an embodiment for an external gripping robot hand. However, if the embodiment is for an internal gripping robot hand, then instead of selecting the finger which is initially at the greater distance from the predetermined position, it becomes necessary to select the finger which initially is at the lesser distance from the predetermined position. Thus, in an embodiment for an internal gripping robot hand, this step requires selecting the finger at the lesser distance from the predetermined position to be the position-controlled finger rather than selecting the finger at the greater distance. This is the only difference in method between an external and an internal gripping hand.

In accordance with the present invention, there is provided the step of moving each position-controlled finger toward the predetermined position. As embodied herein, the step of moving each position-controlled finger toward the predetermined position includes actuating a pneumatic cylinder 40 having a piston 42 and piston rod 54 attached to a robot hand finger 32. As shown in FIGS. 2, 3, and 4, each robot finger is attached to one end of a piston rod 54, which forms part of pneumatic cylinder 40. A first chamber 52 and a second chamber 56 of cylinder 40 are separated by a piston 42 at the end of piston rod 54 opposite the end attached to finger 32.

As shown in FIG. 2, a supply pressure line 92 has a first branch supply line 94 and a second branch supply line 96. First branch supply line 94 is connected to one of two input ports 98 of 3-way solenoid valve 50, and second branch supply line 96 is connected to an input port 100 of proportional servovalve 58. A first cylinder line 102 is connected at one end to first chamber 52 of pneumatic cylinder 40, and first chamber 52 partially encloses piston rod 54. First cylinder line 102 has a second end connected to an output port 104 of 3-way solenoid valve 50. An intermediate line 106 is connected at one end to a first output port of servovalve 58 and at the other end to another input port 98 of 3-way solenoid valve 50. A second cylinder line 108 is connected at one end to second chamber 56 of pneumatic cylinder 40 and has a first branch cylinder line 110 connected to an input port of 2-way solenoid valve 48. Second cylinder line 108 has a second branch cylinder line 112 connected to a second output port of servovalve 58.

As shown in FIG. 2, pneumatic cylinder 40 is pressurized by pneumatic jet-pipe servovalve 58. The pressure difference being applied across piston 42 while the supply pressure of supply pressure line 92 is applied through servovalve 58, causes the finger to move.

In accordance with the method of the present invention, there is provided the step of controlling movement of the position-controlled finger according to the position of the position-controlled finger relative to the fixed point of the robot hand. As embodied herein, this step is accomplished by an electronic microcomputer in conjunction with the linear potentiometer associated with the position-controlled finger. The microcomputer is programmed to determine whether the position-controlled finger is required to be moved in a hand-opening or hand-closing direction in order to position the object at the desired position relative to a fixed point of the robot hand. Once the microcomputer has determined whether further movement of the position-controlled finger is required and also the direction in which such movement should be effected, then the microcomputer sends a digital signal that is proportional to the distance required to be travelled and has an appropriate sign according to the direction of travel, to a digital-to-analog coverter. The digital signal then is converted in the digital-to-analog converter into an analog signal which is provided to servovalve 58 of pneumatic supply circuit 44 of the position-controlled finger. The voltage signal received by servovalve 58 causes same to apply a pressure differential across piston 42 that is appropriate to cause movement of finger 32 in the desired direction. In an alternative embodiment of the present invention, the step of controlling movement of the position-controlled finger is effected based upon the position of the force-controlled finger as well as the position of the position-controlled finger. In this special case illustrated in FIG. 11, the robot hand is capable of centering a symmetrical object at the center of the robot hand without prior knowledge of the dimensions of the object.

In accordance with the method of the present invention, there is provided the step of sensing the gripping force (also referred to as the touch force) between the force-controlled finger and the object. As embodied herein, this step is accomplished by the microcomputer in cooperation with the force sensor of the force-controlled finger. The dual strain gages comprising the force sensor on the force-controlled finger send a signal proportional to the strain on the finger. This signal is converted into a voltage and then a digital signal which can be processed by the microcomputer.

In further accordance with the method of the present invention, there is provided the step of controlling movement of the force-controlled finger according to the touch force sensed between the force-controlled finger and the object. As embodied herein, this step is accomplished by the microcomputer in cooperation with the force sensor of the force-controlled finger. The microcomputer is programmed with the predetermined touch force which is to be maintained in order to hold the object in the robot hand during the repositioning procedure. The microcomputer is also programmed to monitor the force sensor signal indicating the touch force between the force-controlled finger and the object and to calculate the difference between this touch force signal and the predetermined touch force signal stored in memory. The microcomputer sends a digital signal proportional to the difference calculation, to a digital-to-analog converter. The magnitude and sign of the digital signal supplied to the converter determines whether the force-controlled finger applies a greater touch force or a reduced touch force in order to attain the predetermined desired touch force to be applied against the object. The converter transforms the digital signal to an analog signal that is then supplied to servovalve 58 associated with the force-controlled finger. The signal supplied to the servovalve causes same to adjust the pressure differential across piston 42 such that the finger applies a greater or lesser force against the object. Concurrently, the microcomputer position controls the position-controlled finger to maintain its position.

In still further accordance with the method of the present invention, there is provided the step of stopping movement of each position-controlled finger when the object reaches the predetermined position relative to the fixed point of the robot hand. As embodied herein, the step of stopping movement of the position-controlled finger when the object reaches the predetermined position relative to the fixed point of the robot hand is accomplished by the microcomputer in cooperation with the linear potentiometer and servovalve 58. When the microcomputer receives a signal from the linear potentiometer of the position-controlled finger that indicates accomplishment of the positioning of the object at the predetermined position, the microcomputer sends a signal to servovalve 58 of the position-controlled finger that results in equilibrating the pressure across piston 42 such that finger 32 ceases movement.

Figure 10:
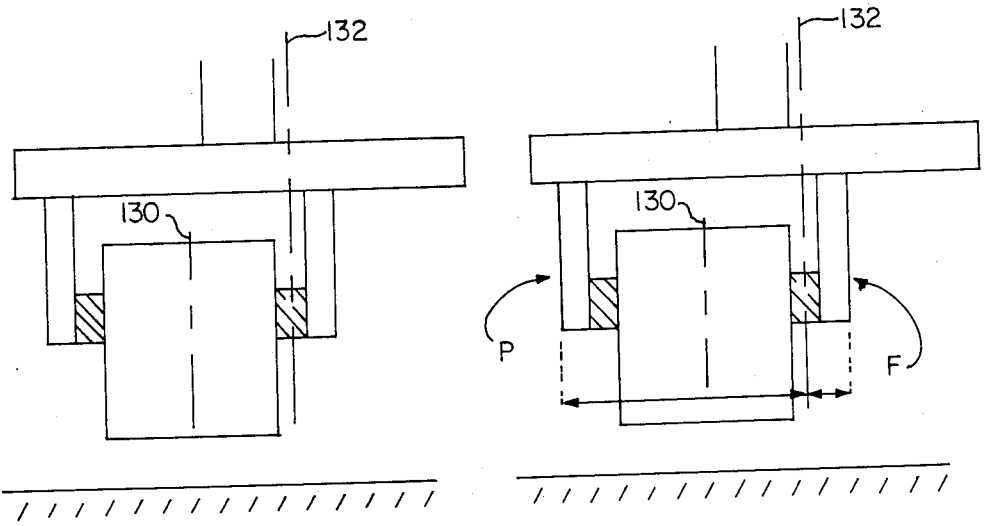
FIG. 10 is a schematic diagram of an embodiment of the method of the present invention.
Figure 10:
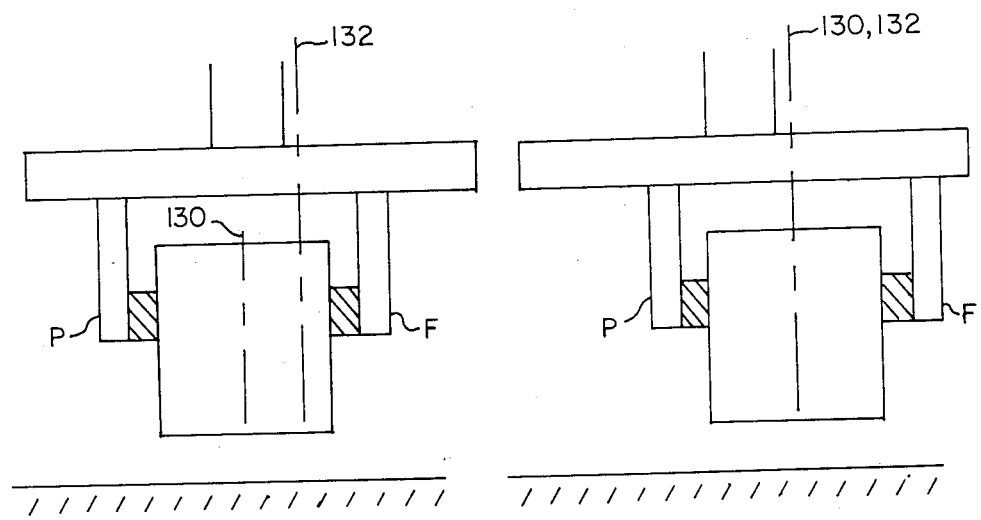

In yet further accordance with the method of the present invention, there is provided the step of stopping each force-controlled finger when each position-controlled finger is stopped and the predetermined gripping force is being applied to the object. As embodied herein and illustrated schematically in FIG. 2, robot hand control means 74 monitors the output signal from force sensor means 80, which is mounted near the free end of finger 32. Upon receipt of a force sensor output signal corresponding to a predetermined touch force, hand control means 74 sends a signal to servovalve 58 such that the servovalve supplies equilibrating pressures to the two chambers of pneumatic cylinder 40 of the force-controlled finger and stops movement of piston 42 and corresponding finger 32. FIGS. 10 and 11 illustrate two embodiments of the method of the present invention. In FIGS. 10 and 11, the line designated 130 indicates the position of the object grasped between the fingers, and the line designated 132 indicates the predetermined position to which the object is to be translated.

Figures 11A, 11B:
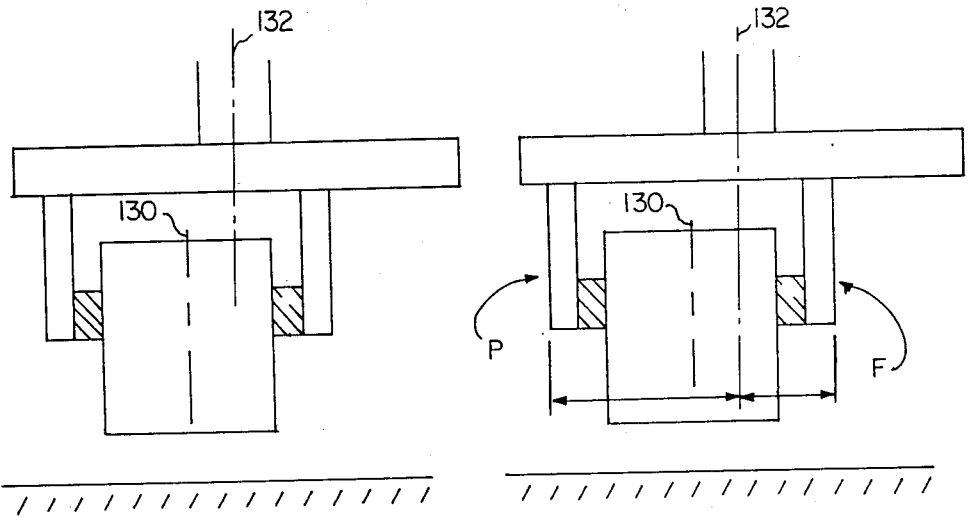
FIG. 11 is a schematic diagram of an alternative embodiment of the method of the present invention.

In FIGS. 10a and 11a, the position of each finger relative to a fixed point of the robot hand is being sensed, and a determination is being made concerning whether each finger is at the greater distance from the predetermined position 132.

In FIGS. 10b and 11b, the letter "P" designates the finger at the greater distance which has been selected as the position-controlled finger, and the letter "F" designates the finger which has been selected to be force-controlled. FIGS. 10 and 11 illustrate an external gripping robot hand. In an internal gripping hand embodiment of the present invention, FIGS. 10b and 11b would be changed by selecting the finger at the lesser distance from predetermined position 132 as the finger to be position-controlled and selecting the other finger as the finger to be force-controlled.

Figures 11C, 11D:
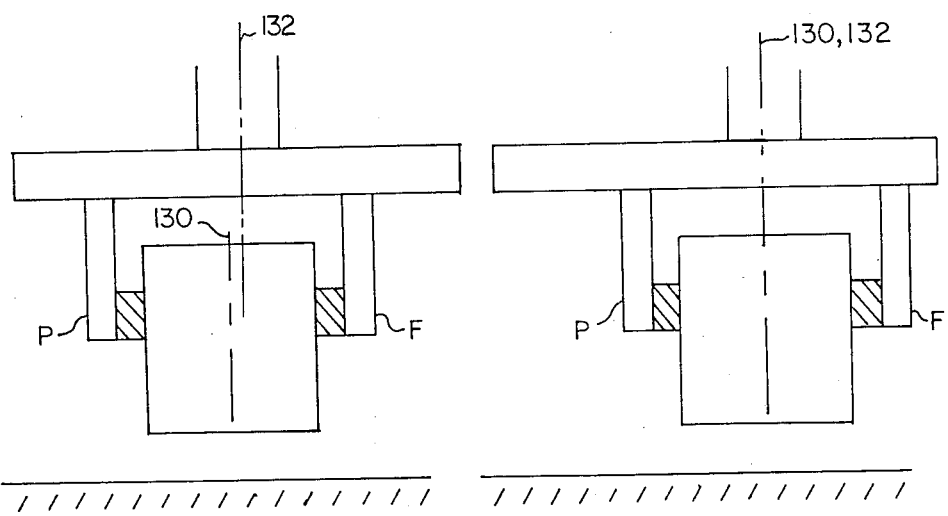

In the external gripping finger embodiment illustrated in FIGS. 10c and 11c, the position-controlled finger is moved toward predetermined position 132. The position of the position-controlled finger is being controlled relative to a fixed point of the robot hand. The gripping force betwen the force-controlled finger and the object is being sensed in FIGS. 10c and 11c, and the movement of the force-controlled finger is controlled according to the gripping force sensed between the force-controlled finger and the object.

As shown in FIGS. 10d and 11d, the movement of the position-controlled finger is stopped when the object, which is indicated by the numeral 130, reaches the predetermined position 132. When the position-controlled finger is stopped and the predetermined gripping force is applied to the object, the force-controlled finger also is stopped.

Note that in the embodiment illustrated in FIG. 11, the position of the position-controlled finger is controlled based on the position of the force-controlled finger as well as the position of the position-controlled finger. Moreover, in the embodiment illustrated in FIG. 11, the predetermined position is selected as the centerline of the robot hand. This selection of the predetermined position is a result of controlling the position-controlled finger based in part on the position of the force-controlled finger.

Accordingly, the pneumatic cylinders which actuate each contacting means of the robot hand embodiment of the present invention are controlled by a servovalve. The pneumatic servovalve can be used for proportional control of pressure once the fingers are holding the object. Object touch forces of a predetermined magnitude are attained by a microcomputer robot hand control means controlling a servovalve in accordance with information supplied by force sensors in the fingers. The position of each finger is monitored by the microcomputer, and the servovalve associated with the position-controlled finger is controlled by the microcomputer according to the position of the object as calculated by the microcomputer based upon information supplied from the linear potentiometers of both fingers.

It will be apparent to those skilled in the art that various modifications and variations can be made in the apparatus and method for repositioning a mislocated object with a robot hand having a means for contacting the object, without departing from the scope or spirit of the invention. Thus, it is intended that the present invention cover the modifications and variations of this invention provided these modifications and variations come within the scope of the appended claims and their equivalents.

```
0010  /*     MAIN PROGRAM  A HAND
0020         PROGRAM INTERFACES HAND WITH ROBOT
0030         THIS PROGRAM WAITS FOR SIGNAL TO CLOSE HAND
0040         AS WELL AS CORRECT VALUE FOR FORCE
0050
0060         A/D CHANNELS :
0070            0  -  POSITION OF LEFT FINGER
0080            1  -  FORCE SENSOR FOR LEFT FINGER
0090            2  -  FORCE SENSOR FOR RIGHT FINGER
0100            3  -  NOT USED
0110            4  -  POSITION OF RIGHT FINGER
0120            5  -  BREAK BEAM OUTPUT
0130            6  -  LEFT FINGER PROXIMITY OUTPUT
0140            7  -  RIGHT FINGER PROXIMITY OUTPUT
0150            8  -  WEIGHT SENSORS  (USES GAGE PROCEDURE)
0160            9  -  ROBOT'S RADIUS OUTPUT
0170           10 - 15  NOT USED
0180  */
0190
0200  HAND: PROC OPTS(MAIN)
0210        DCL I, DAUN1, DAUN2
0220        DCL VALUE0 SIGNED BIN(2), VALUE1 SIGNED BIN(2)
0230        DCL VALUE2 SIGNED BIN(2), VALUE3 SIGNED BIN(2)
0240        DCL THRESH  SIGNED BIN(2)
0250        DCL STR0 CHAR(18) INIT('ENTER CALIBRATION ')
0260        DCL STR02 CHAR(18) INIT('- A/D UNITS PER LB')
0270        DCL CR0 BIN INIT($0D), LF0 BIN INIT($0A)
0280        DCL STR1 CHAR(18) INIT('ENTER THRESHOLD - ')
0290        DCL CR1 BIN(2) INIT($0D0A)
0300        DCL STR2 CHAR(20) INIT('ENTER BREAK VALUE - ')
0310        DCL CR2 BIN(2) INIT($0D0A)
0320        DCL STR3 CHAR(22) INIT('ENTER FINGER OFFSET - ')
0330        DCL CR3 BIN(2) INIT($0D0A)
0340        DCL STR4 CHAR(13) INIT('ENTER LCONS -')
0350        DCL CR4 BIN(2) INIT($0D0A)
0360        DCL STR5 CHAR(13) INIT('ENTER RCONS -')
0370        DCL CR5 BIN(2) INIT($0D0A)
0380        DCL STR9 CHAR(21) INIT('ZERO1 AND ZERO2 ARE: ')
0390        DCL Z1 CHAR(10),  Z2 CHAR(10)
0400        DCL CR9 BIN(2) INIT($0D0A)
0410
```

```
0420        DCL DATA BIN DEFINED $E020
0430        DCL DATB BIN DEFINED $E022
0440        DCL CNTRLA BIN DEFINED $E021
0450        DCL CNTRLB BIN DEFINED $E023
0460        DCL SWICHL   SIGNED BIN(2) DEFINED $B000
0470        DCL SWICHR   SIGNED BIN(2) DEFINED $B002
0480        DCL CONTRL   SIGNED BIN(2) DEFINED $B004
0490        DCL LPOS     SIGNED BIN(2) DEFINED $B006
0500        DCL RPOS     SIGNED BIN(2) DEFINED $B008
0500        DCL RPOS     SIGNED BIN(2) DEFINED $B008
0510        DCL SWITCH   SIGNED BIN(2) DEFINED $B00A
0520        DCL OFFSET   SIGNED BIN(2) DEFINED $B00C
0530        DCL CALIB    SIGNED BIN(2) DEFINED $B00E
0540        DCL ZERO,1   SIGNED BIN(2) DEFINED $B010
0550        DCL ZERO2    SIGNED BIN(2) DEFINED $B012
0560        DCL LCONS    SIGNED BIN(2) DEFINED $B014
0570        DCL RCONS    SIGNED BIN(2) DEFINED $B016
0580
0590 /*       OPEN FINGERS                                    */
0600
0610        VALUE1 = -1000
0620        DAUN1 = 1
0630        DAUN2 = 2
0640        CALL DASET( DAUN1, VALUE1 )
0650        CALL DASET( DAUN2, VALUE1 )
0660
0670 /*    SET UP CONDITIONS
0680         "A" REGISTER IS FOR INPUTS
0690         "B" REGISTER IS FOR OUTPUTS                      */
0700
0710        CNTRLA = $00
0720        DATA = $00
0730        CNTRLB = $00
0740        DATB = $FF
0750
0760 /*    SET UP CONTRL REGISTERS TO ACCESS DATA              */
0770
0780        CNTRLA = $04
0790        CNTRLB = $04
0800        DATB = $80
0810
0820 /*    FIND CALIBRATION VALUES
0830
0840    CALIB   = A/D UNITS PER POUND
0850    CONTRL  = TARGET VALUE FOR CONTROL
0860    ZERO1   = A/D LEVEL ON LEFT FOR ZERO FORCE
0870    ZERO2   = A/D LEVEL ON RIGHT FOR ZERO FORCE
0880    LCONS   = D/A VALUE TO APPLY TO LEFT FINGER AFTER PROX SIGNAL
0890    RCONS   = D/A VALUE TO APPLY TO RIGHT FINGER AFTER PROX SIGNAL
0900                                                          */
0910
0920      CALL DSPLY<,, ADDR(STR0) >
0930      CALL RDVAL( CALIB )
0940
0950      CALL DSPLY<,, ADDR(STR1) >
```

```
0960        CALL RDVAL( THRESH )
0970
0980        ZERO2 = 0
0990        DO I = 1 TO 20
1000           CALL ADREAD<, 2, >
1010           GIVING<,, VALUE2 >
1020           ZERO2 = ZERO2 + VALUE2
1030        END
1040        ZERO2 = ZERO2 / 20
1050
1060        ZERO1 = 0
1070        DO I = 1 TO 20
1080           CALL ADREAD<, 1, >
1090           GIVING<,, VALUE1 >
1100           ZERO1 = ZERO1 + VALUE1
1110        END
1120        ZERO1 = ZERO1 / 20
1130
1140        Z1 = ZERO1
1150        Z2 = ZERO2
1160        CALL DSPLY<,, ADDR(STR9) >
1170
1180 /*     FIND BREAK-BEAM SWITCH VALUE AND OFFSET    */
1190
1200        CALL DSPLY<,, ADDR(STR2) >
1210        CALL RDVAL( SWITCH )
1220
1230        CALL DSPLY<,, ADDR(STR3) >
1240        CALL RDVAL( OFFSET )
1250
1260 /*     FIND LCONS AND RCONS                       */
1270
1280        CALL DSPLY<,, ADDR(STR4) >
1290        CALL RDVAL( LCONS )
1300
1310        CALL DSPLY<,, ADDR(STR5) >
1320        CALL RDVAL( RCONS )
1330
1340 /*    DATA RECEIVED FROM PDP-11 ( VIA DATA ):
1350          $00  -  RELEASE OBJECT AND RETURN HAND TO OPEN POSITION
1360          $01  -  CALL LOCATE
1370          $02  -  CALL CENTER
1380          ELSE -  CALL GRASP,  READ FORCE*8 LEVEL IN DATA BITS
1390
1400
1410          DATA SENT TO PDP-11 ( VIA DATB ):
1420          $80  -  CENTER OF OBJECT LOCATED, STOP JOGGING
1430                  OR INDETERMINATE STATUS BEFORE GRASPING
1440          $81  -  BEGIN JOG TO FIND CENTER OF OBJECT
1450          $82  -  FAR SIDE OF OBJECT IS LOCATED, BACK UP TO
1460                  FIND CENTER
1470          $83  -  HAND HAS GRASPED THE OBJECT, START MOVING
1480
```

```
1490
1500        NOTE - HIGH TO LOW TRANSITION OF BIT 8 OF DATB
1510               SWITCHES SOLENOID VALVE TO BEGIN MOTION
1520 */
1530
1540
1550 START: IF( DATA EQ $00 ) THEN
1560            DO
1570            VALUE1 = -1000
1580            CALL DASET( DAUN1, VALUE1 )
1590            CALL DASET( DAUN2, VALUE1 )
1600            END
1610
1620        IF( DATA EQ $01 ) THEN CALL LOCATE
1630
1640        IF( DATA EQ $02 ) THEN CALL CENTER
1650
1660        IF( DATA GT $02 ) THEN
1670            DO
1680            SWICHL = ZERO1 + THRESH
1690            SWICHR = ZERO2 + THRESH
1700            CONTRL = ZERO2 + CALIB * DATA / 8
1710            DATB = $00
1720            DATB = $80
1730            CALL GRASP
1740            END
1750
1760        CALL QUIT
1770        GOTO START
1780
1790        END
```

LOCATE

```
0010 /*          LOCATE FINDS THE CENTER OF THE OBJECT BY
0020             INTERACTING WITH THE ROBOT
0030
0040            A/D CHANNELS -  #5 - BREAK BEAM OUTPUT
0050                            #9 - ROBOT RADIUS
0060
0070            DATA SENT TO PDP-11 ( VIA DATB ):
0080                $80 - CENTER OF OBJECT LOCATED, STOP JOGGING
0090                $81 - BEGIN JOG TO FIND CENTER OF OBJECT
0100                $82 - FAR SIDE OF OBJECT IS LOCATED, BACK UP TO
0110                      FIND CENTER
0120
0130 */
0140 LOCATE: PROCEDURE
0150        DCL RADI SIGNED BIN(2)
0160        DCL RADF SIGNED BIN(2)
0170        DCL VALUE SIGNED BIN(2)
0180        DCL SWITCH SIGNED BIN(2)   DEFINED $B00A
0190        DCL OFFSET SIGNED BIN(2)   DEFINED $B00C
0200        DCL DATA BIN DEFINED $E020
0210        DCL DATB BIN DEFINED $E022
0220
```

```
0230
0240 /*        TELL ROBOT TO START MOVING                    */
0250
0260        DATB = $81
0270
0280
0290 /*     CHECK A/D VALUE ON CHANNEL 5  (BREAK-BEAM SENSOR)
0300             A/D#5  >  SWITCH      - NO OBJECT
0310             A/D#5  <  SWITCH      - OBJECT PRESENT       */
0320
0330 START: CALL ADREAD<, 5, >
0340        GIVING<,, VALUE>
0350        IF( VALUE > SWITCH ) THEN GOTO START
0360
0370
0380 /*        OBJECT IS ENCOUNTERED, READ RADIUS AND
0390           ASSIGN TO RADI                                 */
0400
0410        CALL ADREAD<, 9, >
0420            GIVING<,, RADI >
0430
0440
0450 /*        LOOK FOR OTHER SIDE OF OBJECT, WHEN FOUND
0460           SET RADF                                       */
0470
0480 CONT:  CALL ADREAD<, 5, >
0490        GIVING<,, VALUE >
0500        IF( VALUE < SWITCH )  THEN GOTO CONT
0510
0520
0530 /*        STOP ROBOT AND TELL IT TO BACK UP              */
0540
0550        DATB = $82
0560
0570        CALL ADREAD<, 9, >
0580            GIVING<,, RADF >
0590
0600
0610 /*        WHEN RADIUS REACHES MIDPOINT OF RADI AND RADF,
0620           TELL ROBOT TO STOP BY SENDING $80              */
0630
0640        RADI = ( ( RADI + RADF ) / 2 ) + OFFSET
0650
0660 WAIT:  CALL ADREAD<, 9, >
0670            GIVING<,, RADF >
0680            IF( RADF > RADI ) THEN GOTO WAIT
0690
0700        DATB = $80
0710
0720        RETURN
0730        END
0010 GRASP: PROCEDURE
0020     DCL GAIN1 SIGNED, GAIN2 SIGNED
0030     DCL SET, DAUN1, DAUN2
```

```
0040    DCL DATA BIN DEFINED $E020
0050    DCL DATB BIN DEFINED $E022
0060    DCL DAVA1   SIGNED BIN(2)
0070    DCL DAVA2   SIGNED BIN(2)
0080    DCL VALUE0  SIGNED BIN(2)
0090    DCL VALUE1  SIGNED BIN(2)
0100    DCL VALUE2  SIGNED BIN(2)
0110    DCL VALUE4  SIGNED BIN(2)
0120    DCL VALUE6  SIGNED BIN(2)
0130    DCL VALUE7  SIGNED BIN(2)
0140    DCL SWICHL  SIGNED BIN(2) DEFINED $B000
0150    DCL SWICHR  SIGNED BIN(2) DEFINED $B002
0160    DCL CONTRL  SIGNED BIN(2) DEFINED $B004
0170    DCL LPOS    SIGNED BIN(2) DEFINED $B006
0180    DCL RPOS    SIGNED BIN(2) DEFINED $B008
0190    DCL LCONS   SIGNED BIN(2) DEFINED $B014
0200    DCL RCONS   SIGNED BIN(2) DEFINED $B016
0210
0220    DAUN1 = 1
0230    DAUN2 = 2
0240    GAIN1 = 8
0250    GAIN2 = 8
0260
0270    DAVA1 = 2000
0280    DAVA2 = 2000
0290    CALL DASET( DAUN1, DAVA1 )
0300    CALL DASET( DAUN2, DAVA2 )
0310
0320    LPOS = 0
0330    RPOS = 0
0340
0350 /*     CHECK FOR PROXIMITY SIGNALS                */
0360
0370 START: CALL ADREAD<, 6, >
0380        GIVING<,, VALUE6 >
0390        CALL ADREAD<, 7, >
0400        GIVING<,, VALUE7 >
0410
0420        IF( VALUE7 GT 500 ) THEN GOTO RPROX
0430        IF( VALUE6 GT 500 ) THEN GOTO LPROX
0440
0450        GOTO START
0460
0470
0480 RPROX: DAVA1 = LCONS
0490        DAVA2 = 2000
0500        CALL DASET( DAUN1, DAVA1 )
0510        CALL DASET( DAUN2, DAVA2 )
0520
0530 RPCNT: CALL ADREAD<, 6, >
0540        GIVING<,, VALUE6 >
0550        IF( VALUE6 GT 500 ) THEN GOTO BEGIN
0560
0570        GOTO RPCNT
0580
```

```
0590
0600 LPROX: DAVA1 = 2000
0610        DAVA2 = RCONS
0620        CALL DASET( DAUN1, DAVA1 )
0630        CALL DASET( DAUN2, DAVA2 )
0640
0650 LPCNT: CALL ADREAD<, 7, >
0660        GIVING<,, VALUE7 >
0670        IF( VALUE7 GT 500 ) THEN GOTO BEGIN
0680
0690        GOTO LPCNT
0700
0710
0720 /*  SYSTEM HAS SWITCHED TO THE SOLENOID VALVES
0730     START CHECKING FOR A FORCE SIGNAL
0740     ON THE FINGERS                                      */
0750
0760 BEGIN: CALL ADREAD<, 1, >
0770     GIVING<,, VALUE1 >
0780     CALL ADREAD<, 2, >
0790     GIVING<,, VALUE2 >
0800
0810     IF( VALUE1 GT SWICHL ) THEN GOTO LEFT
0820     IF( VALUE2 GT SWICHR ) THEN GOTO RIGHT
0830
0840     GOTO BEGIN
0850
0860 RIGHT:    CALL ADREAD<, 4, >
0870          GIVING<,, RPOS >
0880          RPOS = RPOS + 25
0890          DAVA2 = 0
0900          CALL DASET( DAUN2, DAVA2 )
0910          DAVA1 = 2000
0920
0930 RCONT:    CALL ADREAD<, 1, >
0940          GIVING<,, VALUE1 >
0950          IF( VALUE1 GT SWICHL ) THEN GOTO CONT
0960          CALL DASET( DAUN1, DAVA1 )
0970
0980          CALL ADREAD<, 4, >
0990          GIVING<,, VALUE4 >
1000          DAVA2 = GAIN2 * ( VALUE4 - RPOS )
1010          CALL DASET( DAUN2, DAVA2 )
1020
1030          GOTO RCONT
1040
1050
1060 LEFT:     CALL ADREAD<, 0, >
1070          GIVING<,, LPOS >
1080          LPOS = LPOS + 25
1090          DAVA1 = 0
1100          CALL DASET( DAUN1, DAVA1 )
1110          DAVA2 = 2000
1120
```

```
1130 LCONT:    CALL ADREAD<, 2, >
1140           GIVING<,, VALUE2 >
1150           IF( VALUE2 GT SWICHR ) THEN GOTO CONT
1160           CALL DASET( DAUN2, DAVA2 )
1170
1180           CALL ADREAD<, 0, >
1190           GIVING<,, VALUE0 >
1200           DAVA1 = GAIN1 * ( VALUE0 - LPOS )
1210           CALL DASET( DAUN1, DAVA1 )
1220
1230           GOTO LCONT
1240
1250
1260 /* CONTACT HAS BEEN MADE
1270     FIND CURRENT VALUE FOR LH FINGER           */
1280
1290 CONT:   IF( LPOS NE 0 ) THEN GOTO CNTRL
1300         CALL ADREAD<, 0, >
1310         GIVING<,, LPOS >
1320
1330
1340 /* START FORCE CONTROL  LOOP                   */
1350
1360 CNTRL:CALL ADREAD<, 2, >
1370         GIVING<,, VALUE2 >
1380         DAVA2 = GAIN2 * ( CONTRL - VALUE2 )
1390           IF( DAVA2 GT 2047 ) THEN DAVA2 = 2047
1400           IF( DAVA2 LT -2047 ) THEN DAVA2 = -2047
1410         CALL DASET( DAUN2, DAVA2 )
1420
1430 /*   START POSITION CONTROL LOOP               */
1440
1450         CALL ADREAD<, 0, >
1460         GIVING<,, VALUE0 >
1470         DAVA1 = GAIN1 * ( VALUE0 - LPOS )
1480           IF( DAVA1 GT 2047 ) THEN DAVA1 = 2047
1490           IF( DAVA1 LT -2047 ) THEN DAVA1 = -2047
1500         CALL DASET( DAUN1, DAVA1 )
1510
1520 /*        TELL ROBOT THAT HAND HAS OBJECT      */
1530
1540         DATB = $83
1550
1560 /*        CHECK FOR COMMAND TO CENTER HAND     */
1570
1580         IF( DATA LT $03 ) THEN RETURN
1590
1600         GOTO CNTRL
1610         END
0010 /*       CENTER POSITIONS THE TWO FINGERS AT THE SAME
0020          DISPLACEMENT VALUE WHILE MAINTAINING A
0030          CONSTANT GRASPING FORCE
0040 */
0050
```

```
0060 CENTER: PROCEDURE
0070     DCL GAIN1 SIGNED, GAIN2 SIGNED
0080     DCL POS BIN, FORCE BIN
0090     DCL DATA BIN DEFINED $E020
0100     DCL DAVA1 SIGNED BIN(2), DAVA2 SIGNED BIN(2)
0110     DCL VALUE2  SIGNED BIN(2)
0120     DCL CONTRL  SIGNED BIN(2)    DEFINED $B004
0130     DCL LPOS    SIGNED BIN(2)    DEFINED $B006
0140     DCL RPOS    SIGNED BIN(2)    DEFINED $B008
0150     DCL ZERO1   SIGNED BIN(2)    DEFINED $B010
0160     DCL ZERO2   SIGNED BIN(2)    DEFINED $B012
0170
0180
0190        POS = 1
0200        FORCE = 2
0210        GAIN1 = 8
0220        GAIN2 = 8
0230
0240
0250 /*     SELECT CORRECT CHANNEL FOR OUTPUT
0260
0270        THE FINGER THAT MUST MOVE TOWARDS THE CENTER
0280        ( I.E. "CLOSE" ) IS POSITION CONTROLLED SINCE
0290        IT HAS THE SLOWEST RESPONSE                          */
0300
0310
0320        CALL ADREAD<, 0, >
0330           GIVING<,, LPOS >
0340        CALL ADREAD<, 4, >
0350           GIVING<,, RPOS >
0360        IF( RPOS GT LPOS ) THEN
0370           DO
0380           POS = 2
0390           FORCE = 1
0400           GAIN1 = -8
0410           CONTRL = ZERO1 - ZERO2 + CONTRL
0420           END
0430
0440
0450 /*     START FORCE CONTROL LOOP                              */
0460
0470 START: CALL ADREAD<, FORCE, >
0480        GIVING<,, VALUE2 >
0490        DAVA2 = GAIN2 * ( CONTRL  - VALUE2 )
0500          IF( DAVA2 GT 2047 ) THEN DAVA2 = 2047
0510          IF( DAVA2 LT -2047 ) THEN DAVA2 = -2047
0520        CALL DASET( FORCE, DAVA2 )
0530
0540
0550 /*     START POSITION CONTROL LOOP                           */
0560
0570        CALL ADREAD<, 0, >
0580        GIVING<,, LPOS >
0590        CALL ADREAD<, 4, >
0600        GIVING<,, RPOS >
```

```
0610
0620         DAVA1 = GAIN1 * ( LPOS - RPOS )
0630         IF( DAVA1 GT 2047 ) THEN DAVA1 = 2047
0640         IF( DAVA1 LT -2047 ) THEN DAVA1 = -2047
0650
0660         CALL DASET( POS, DAVA1 )
0670
0680         IF( DATA EQ $00 ) THEN RETURN
0690
0700         GOTO START
0710         END
0010 ADREAD: PROCEDURE ( ADUNIT, )
0020         DCL ADUNIT  BIN
0030         DCL ADADDR  BIN DEF $E00A
0040         DCL STROBE  BIN DEF $E00B
0050         DCL STATUS  BIN DEF $E00C
0060         DCL RESULT  SIGNED BIN(2) DEF $E00D
0070 /*
0080    START A/D READ
0090 */
0100 START: ADADDR = ADUNIT
0110         STROBE = $11
0120         IF( STATUS LT $80 ) THEN GOTO START
0130 READ:  IF( RESULT LT 2048 ) THEN GOTO FINISH
0140         RESULT = RESULT - 4096
0150 FINISH:RETURN<,, RESULT>
0160 END
0010 DASET:  PROCEDURE ( UNIT, VALUE )
0020         DCL UNIT BIN, VALUE SIGNED BIN(2)
0030         DCL UNIT1 BIN(2) DEF $E006
0040         DCL UNIT2 BIN(2) DEF $E004
0050 /*      */
0055         IF ( VALUE LT $00 ) THEN VALUE=VALUE+4096
0060         IF( UNIT EQ $01 ) THEN
0070            UNIT1 = VALUE
0080         ELSE
0100            UNIT2 = VALUE
0110         RETURN
0120         END
0010 /*
0020    PROGRAM CHECKS FOR ANY KEY DEPRESSION
0030     IF IT FINDS ONE, IT RETURNS CONTROL TO MDOS
0040 */
0050 QUIT: PROCEDURE
0060 $ LDAA $FCF4
0070 $ ASRA
0080 $ BCS STOP
0090         RETURN
0100 STOP: CALL DASET( 1, 0 )
0110        CALL DASET( 2, 0 )
0120        CALL MDOS
0130        RETURN
0140        END
```

```
0010 /*
0020     PROCEDURE READS IN A VALUE FROM THE KEYBOARD
0030     WITHOUT SPECIFYING ALL DIGITS IN ADVANCE
0040 */
0050 RDVAL: PROCEDURE ( VALUE )
0060        DCL INPUT CHAR(7) DEF $B000
0070        DCL DIGIT(7) BIN DEF $B000
0080        DCL PLUS SIGNED BIN(2)
0090        DCL VALUE SIGNED BIN(2)
0100        DCL STRING CHAR(4) INIT('VAL=')
0110        DCL CR BIN INIT($0D)
0120        DCL LF BIN INIT($0A)
0130        DCL ERROR CHAR(25) INIT('ERROR IN INPUT, VALUE = 0')
0140        DCL CR1 BIN INIT($0D)
0150        DCL LF1 BIN INIT($0A)
0160        DCL K BIN, I BIN, NUM BIN
0170 /*         */
0180     CALL DSPLY<,, ADDR(STRING) >
0190     CALL KEYIN<, 6, ADDR(INPUT) >
0200         GIVING<, NUM >
0220 /*   START LOOKING FOR FIRST VALID DIGIT    */
0240        DO I = 1 TO NUM
0250           IF( DIGIT(I) NE $20 ) THEN GOTO START
0260        END
0270        CALL DSPLY<,, ADDR(ERROR) >
0280        VALUE = 0
0290        GOTO FINISH
0300 /*
0310     VALID INPUT
0320 */
0330 START: IF( DIGIT(I) EQ $2D ) THEN
0340         DO
0350         PLUS = -1
0360         VALUE = 0
0370         END
0380        ELSE
0390         DO
0400         PLUS = 1
0410         VALUE = DIGIT(I) - $30
0420         END
0430 /*
0440     CHECK FOR ONLY ONE DIGIT
0450 */
0460        IF( I EQ NUM ) THEN GOTO FINISH
0470 /*
0500     FINISH REST OF VALUE
0520 */
0530        I = I + 1
0540        DO K = I TO NUM
0550           VALUE = ( DIGIT(K) - $30 ) + ( VALUE * 10 )
0560        END
0570        VALUE = PLUS * VALUE
0580 FINISH: RETURN
0590        END
```

What is claimed is:

1. A method for translating an object held by at least two fingers of a robot hand at a predetermined gripping force to a predetermined position relative to a fixed point of the robot hand, the method comprising:
   sensing the position of each finger relative to the fixed point of the robot hand;
   for each finger, determining whether said finger is at the greater distance from the predetermined position;
   selecting the finger at the greater distance as the finger to be position-controlled and selecting the other finger as the finger to be force-controlled;
   moving said position-controlled finger toward the predetermined position;
   controlling movement of said position-controlled finger according to the position of said position-controlled finger relative to the fixed point of the robot hand;
   sensing the gripping force between said force-controlled finger and the object;
   controlling movement of said force-controlled finger according to said gripping force sensed between said force-controlled finger and the object;
   stopping movement of said position-controlled finger when the object reaches the predetermined position relative to the fixed point of the robot hand; and
   when said position-controlled finger is stopped and the predetermined gripping force is applied to the object, then stopping said force-controlled finger.

2. A method as in claim 1, wherein:
   the step of controlling movement of said position-controlled finger is effected according to the position of the force-controlled finger as well as the position of the position-controlled finger.

3. A method for translating an object held by at least two fingers of a robot hand at a predetermined gripping force to a predetermined position relative to a fixed point of the robot hand, the method comprising:
   sensing the position of each finger relative to the fixed point of the robot hand;
   for each finger, determining whether said finger is at the lesser distance from the predetermined position;
   selecting the finger at the lesser distance as the finger to be position-controlled and selecting the other finger as the finger to be force-controlled;
   moving said position-controlled finger toward the predetermined position;
   controlling movement of said position-controlled finger according to the position of said position-controlled finger relative to the fixed point of the robot hand;
   sensing the gripping force between said force-controlled finger and the object;
   controlling movement of said force-controlled finger according to said gripping force sensed between said force-controlled finger and the object;
   stopping movement of said position-controlled finger when the object reaches the predetermined position relative to the fixed point of the robot hand; and
   when said position-controlled finger is stopped and the predetermined gripping force is applied to the object, then stopping said force-controlled finger.

4. A method as in claim 3, wherein:
   the step of controlling movement of said position-controlled finger is effected according to the position of the force-controlled finger as well as the position of the position-controlled finger.

5. An apparatus for translating an object held by at least two fingers of a robot hand, to a predetermined position relative to a fixed point of the robot hand, the apparatus comprising:
   means for sensing the position of each finger relative to the fixed point of the robot hand;
   finger differentiation means for identifying the finger at the greater distance from the predetermined position as the position-controlled finger and for identifying the other finger as the force-controlled finger;
   means for moving each finger;
   means for controlling movement of said position-controlled finger according to the position of said position-controlled finger relative to the fixed point of the robot hand;
   means for sensing the force between said force-controlled finger and the object; and
   means for controlling movement of said force-controlled finger according to the force sensed between the force-controlled finger and the object.

6. An apparatus as in claim 5, wherein:
   said position sensing means includes for said position-controlled finger a linear potentiometer connected to said means for controlling movement of said position-controlled finger and for said force-controlled finger a linear potentiometer connected to said means for controlling movement of said force-controlled finger.

7. An apparatus as in claim 5, wherein:
   said force sensing means includes at least a pair of strain gages on each finger, each said pair of strain gages being located with the centerpoint of each gage coinciding with the longitudinal centerline of each said finger.

8. An apparatus for translating an object held by at least two fingers of a robot hand, to a predetermined position relative to a fixed point of the robot hand, the apparatus comprising:
   means for sensing the position of each finger relative to the fixed point of the robot hand;
   finger differentiation means for identifying the finger at the lesser distance from the predetermined position as the position-controlled finger and for identifying the other finger as the force-controlled finger;
   means for moving each finger;
   means for controlling movement of said position-controlled finger according to the position of said position-controlled finger relative to the fixed point of the robot hand;
   means for sensing the force between said force-controlled finger and the object; and
   means for controlling movement of said force-controlled finger according to the force sensed between the force-controlled finger and the object.

9. An apparatus as in claim 8, wherein:
   said position sensing means includes for said position-controlled finger a linear potentiometer connected to said means for controlling movement of said position-controlled finger and for said force-controlled finger a linear potentiometer connected to said means for controlling movement of said force-controlled finger.

10. An apparatus as in claim 8, wherein:
said force sensing means includes at least a pair of strain gages on each finger, each said pair of strain gages being located with the centerpoint of each gage coinciding with the longitudinal centerline of each said finger.

* * * * *